3,497,511
TRIAZINE COMPOUNDS
Werner Schwarze and Hermann Schulz, Frankfurt am Main, Germany, assignors to Deutsche Gold- und Silber-Scheideanstalt vormals Roessler, Frankfurt am Main, Germany
No Drawing. Filed Apr. 15, 1965, Ser. No. 448,236
Claims priority, application Germany, Apr. 17, 1964, D 44,184
Int. Cl. C07d 55/50; A01n 9/22
U.S. Cl. 260—249.8   1 Claim

ABSTRACT OF THE DISCLOSURE

Triazine compounds of the formula

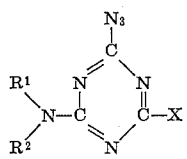

in which X represents —OR, —SR, —CN or halogen, R is lower alkyl, each of $R^1$ and $R^2$ is hydrogen, lower alkyl, lower alkenyl, as well as their use as agents for influencing the growth of plants.

---

The present invention relates to novel triazine compounds which are especially adapted for regulating the growth of plants and, particularly, as herbicides and a method of regulating the growth of plants and compositions useful therefor.

The 2,4-bis-alkylamino-6-azido-s-triazines and their use as plant growth regulating substances has been disclosed in copending application Ser. No. 286,187 of Schultz et al., now abandoned.

The novel compounds according to the invention are of the formula:

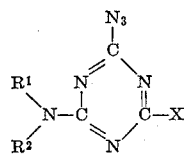

in which X represents —OR, —SR or a —CN group or a halogen atom, preferably, chlorine, R represents lower alkyl with 1 to 4 carbon atoms and each of $R^1$ and $R^2$ individually represents hydrogen, lower alkyl, such as methyl, ethyl, propyl, butyl and amyl, or alkenyl groups, such as allyl, which if desired can be substituted by —OR, —CN or $NO_2$ groups.

The novel compounds according to the invention, even at low concentrations, render it possible to influence the growth of plants. At suitable concentrations they can be used as herbicides.

The compounds according to the invention can, depending upon the charatcer of R, $R^1$, $R^2$ and X, be used for the extermination or selective suppression of weeds among cultivated plants or also for completely killing and preventing undesirable plant growth. In certain circumstances, they can also be used as plant growth regulating agents, for example, for defoliation or reducing the amount of fruit which is set or for retarding blossoming. As well as influencing living plants, these compounds can also be used for sterilizing the soil. They can be used as such or in admixture with one another or in admixture with other herbicides or with fungicides, insecticides or fertilizers.

The following are examples of solvents for the triazine compounds: alcohols, ketones, hydrocarbons such as toluene, halogenated hydrocarbons such as chloronaphthalene, mineral oils such as diesel oil, vegetable oils or mixtures of the said substances.

The triazine compounds of the invention can be applied by known methods which are familiar to any expert in this field, the choice of the method depending on existing circumstances and the properties of the herbicide. The known formulations can generally be used for this purpose.

For example, more or less concentrated solutions in organic solvents can be prepared and these are further diluted with these solvents prior to use.

The novel compounds according to the invention, for example, can be prepared by reacting a compound of the formula

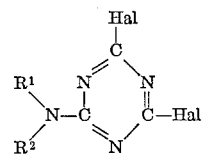

in which Hal is a halogen atom and, preferably, is chlorine with a salt, preferably, an alkali metal salt of hydrazoic acid at a temperature between 20 to about 50° C. in the presence of water or an organic solvent to produce a compound of the formula

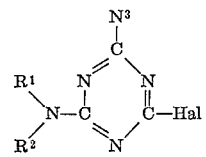

Suitable organic solvents, for instance, are: ketones, ethers, esters, dimethyl formamide and especially alcohols or their solutions or mixtures. The reaction can also be carried out in suspension.

It also is possible to react a compound of the formula

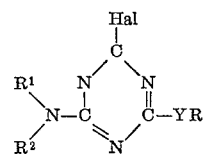

in which Y represents an oxygen or sulfur atom with a salt, preferably, an alkali metal salt of hydrazoic acid at a temperature of 20 to about 50° C. in the presence of at least catalytic quantities of a lower, if desired, mixed, aliphatic tertiary amine, preferably, trimethylamine and in the presence of an organic solvent especially an alcohol, if desired, in admixture with water to produce a compound of the formula:

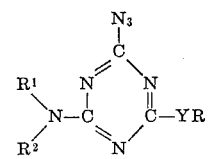

During the reaction the catalytic amine may be present in quantities up to equimolecular quantities. However, usually 0.01 to 0.6 mol of the amine per mol of triazine compound suffice. Methanol is the most preferred solvent.

It, however, also is possible to react a compound of Formula IV with an equimolecular quantity of a lower aliphatic tertiary amine, preferably, trimethyl amine in the presence of an inert organic solvent and recover the quaternary compound formed as intermediate and reacting such intermediate with the salt of hydrazoic acid at 20 to about 50° C. in the presence of water and/or an alcohol or dimethyl formamide to produce a compound of Formula V. In such procedure benzene, gasoline or other hydrocarbon can be employed as the inert solvent. It furthermore is possible to react a compound of the Formula IV with the salt of hydrazoic acid in a polar organic solvent, prefereably, dimethyl formamide or N-methyl-pyrrolidone at a temperature betwen 50 and about 100° C. to form a compound of the Formula V.

In addition, a compound of the formula:

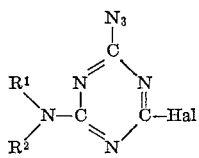

VI can be reacted with an alcoholate at a temperature between about 20° C. and the boiling point of the organic solvent employed, preferably, the alcohol of the alcoholate to produce a compound of the formula

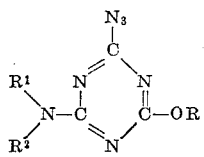

VII

Still further, a compound of the Formula VI can be reacted, as described above, in the presence of at least catalytic quantities of an aliphatic tertiary amine, with an alkali metal cyanide, preferably, sodium cyanide rather than the salt of hydrazoic acid to produce a compound of the Formula VII.

A compound of Formula VI can also be reacted with an alkali metal cyanide, preferably, sodium cyanide in the presence of a polar organic solvent, preferably, dimethyl formamide or N-methyl pyrrolidone at a temperature between about 50 and 100° C. to produce a compound of the formula

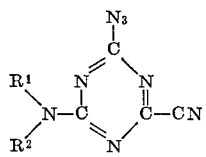

VIII

In Formulae II to VIII R, $R^1$ and $R^2$ have the same significance as in Formula I.

The following examples will serve to illustrate the novel compounds according to the invention and their preparation, as well as compositions containing such novel compounds suitable for regulating the growth of plants.

EXAMPLE 1

2-isopropylamino-4-azido-6-chloro-s-triazine 92.25 g. (0.5 mol) of cyanuric chloride were suspended in 250 ml. of acetone and cooled to 0° C. At this temperature 43 g. of a 70% aqueous solution of isopropylamine and 100 ml. of 20% aqueous NaOH were run in. Care was taken that the pH of the reaction mixture did not exceed 8. Subsequently a suspension of 34.1 g. of sodium azide in 50 ml. of $H_2O$ were added all at once and the temperature was allowed to rise to 35–40° C. After 6 hours the acetone was drawn off under vacuum and the crystalline residue filtered on a suction filter and washed chlorine free. After drying under vacuum 99 g. of white crystals of a melting point of 70–71° C. remained.

Analysis.—$C_6H_8N_7Cl$. Calculated (percent): C, 33.74; H, 3.76; N, 45.86; Cl, 16.6. Found (percent): C, 33.91; H, 3.90; N, 46.1; Cl, 16.5. (Mol. wt.=213.5) The yield was 92.8% of theory.

The following substances of the formula

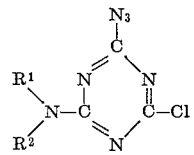

| $R^1$ | $R^2$ | Melting point, ° C. |
|---|---|---|
| H | $CH_3$ | 112–113 |
| H | $C_2H_5$ | 60 |
| H | i-$C_4H_9$ | 79–80 |
| H | t-$C_4H_9$ | 49–50 |
| $CH_3$ | $CH_3$ | 79–80 |
| $C_2H_5$ | $C_2H_5$ | Oil |
| H | H | [1] Ca. 210 |

[1] Carbonized.

EXAMPLE 2

2-ethylamino-4-azido-6-methoxy-s-triazine 1.75 g. of sodium were dissolved in 100 ml. of methanol and then 15 g. of 2-ethylamino-4-azido-6-chloro-s-triazine were added thereto. The mixture was boiled under reflux until it reacted neutral (about 30 minutes). The methanol was then drawn off under vacuum and water added to the residue. The product crystallized rapidly and was filtered off on a suction filter. After drying 10.75 g. of a white powder with a melting point of 100–101° C. remained.

Analysis.—For $C_6H_9N_7O$. Calculated (percent): C, 36.9; H, 4.6; N, 50.25. Found (percent): C, 37.1; H, 4.7; N, 49.9. (Mol. wt.=195.) The yield was 73.3% of theory.

The following substances of the formula:

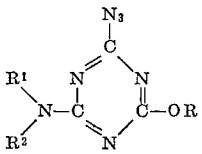

were prepared analogously:

| R | $R^1$ | $R^2$ | Melting point, ° C. |
|---|---|---|---|
| $CH_3$ | H | i-$C_3H_7$ | 110–111 |
| $CH_3$ | H | t-$C_4H_9$ | Oil |
| $CH_3$ | H | $CH_3$ | 115–116 |
| $CH_3$ | H | H | [1] >250 |
| $CH_3$ | $C_2H_5$ | $C_2H_5$ | Oil |
| $C_2H_5$ | $C_2H_5$ | $C_2H_5$ | Oil |

[1] Decomposition.

EXAMPLE 3

2-isopropylamino-4-azido-6-methylmercapto-s-triazine 21 g. of 2-isopropylamino-4-chloro-6-methylmercapto-s-triazine were dissolved in 100 ml. of methanol and an aqueous solution of 6.9 g. of sodium amide in 40 ml. of water was then added thereto. About 6 g. of trimethylamine gas were then introduced whereupon the temperature rose to 53° C. The reaction mixture was stirred at this temperature for 2 hours and the methanol then drawn off under vacuum. The residue was taken up in water. It soon crystallized and was filtered off on a suction filter. After drying 20.2 g. of a yellowish white powder with a melting point of 85–86° C. remained.

Analysis.—For $C_7H_{11}N_7S$. Calculated (percent): C, 37.4; H, 4.9; N, 43.6; S, 14.2. Found (percent): C, 37.7; H, 5.1; N, 43.6; S, 13.9. (Mol. wt.=225.) The yield was 89.5% of theory.

The following compounds of the formula:

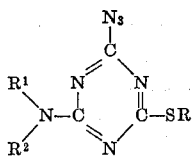

were prepared in an analogous manner:

| R | R¹ | R² | Melting point, °C. |
|---|---|---|---|
| $CH_3$ | H | $CH_3$ | 159–160 |
| $CH_3$ | H | $C_2H_5$ | 110–112 |
| $CH_3$ | H | $t-C_4H_9$ | 44–46 |
| $CH_3$ | H | $t-C_5H_{11}$ | Oil |
| $CH_3$ | $CH_3$ | $CH_3$ | 141–142 |
| $n-C_4H_9$ | H | $C_2H_5$ | 71–73 |
| $n-C_4H_9$ | H | $i-C_4H_9$ | 39–40 |
| $n-C_4H_9$ | H | $t-C_4H_9$ | Oil |
| $n-C_4H_9$ | $C_2H_5$ | $C_2H_5$ | Oil |

EXAMPLE 4

2-methylamino-4-azido-6-cyano-s-triazine 25 g. of 2-methylamino-4-azido-6-chloro-s-triazine were dissolved in 250 ml. of methanol and a solution of 3.3 g. of sodium amide dissolved in 20 ml. $H_2O$ was then added thereto. Subsequently about 10 g. of trimethylamine gas were introduced into the reaction mixture at 0–5° C. and the mixture then stirred for 2 hours at 20° C., the methanol drawn off under vacuum and the residue taken up in water, suction filtered, washed and dried vacuum. 13.2 g. of a light yellow powder of a melting point of 119–120° C. were obtained.

Analysis.—For $C_5H_4N_8$. Calculated (percent): C, 34.1; H, 2.3; N, 63.6. Found (percent): C, 33.9; H, 2.5; N, 62.9. (Mol. wt.=176.)

2-t-butylamino-4-azido-6-cyano-s-triazine (yellow oil) and 2-isopropylamino-4-azido-s-triazine (melting point 119–120°) were produced in an analogous manner.

Several examples of typical compositions for application of the compounds according to the invention follow. In such examples the proportions are by weight unless specified otherwise.

EXAMPLE 5

10 parts of 2-isopropylamino-4-azido-6-chloro-s-triazine, 89 parts of bentonite or kieselguhr and 1 part of finely divided pyrogenic silica were ground to extreme fineness in a ball mill. The resulting ground product is suitable for application as a dusting powder.

EXAMPLE 6

A solution of 20 parts of 2-t-butylamino-4-azido-6-methoxy-s-triazine, 90 parts of dimethyl formamide and 10 parts of dodecyl phenyl polyethylene glycol ether was prepared. Such solution upon admixture with water produces a stable dispersion.

EXAMPLE 7

A mixture was prepared from 25 parts of 2-i-propylamino-4-azido-6-methylmercapto-s-triazine, 50 parts of methyl cyclohexanone, 15 parts of xylene and 10 parts of an alkyl substituted naphthalene sulfonate. The mixture upon addition to water produces a stable dispersion.

EXAMPLE 8

A mixture of 20 parts of 2-ethylamino-4-azido-6-cyano-s-triazine, 70 parts of kaolin, 7 parts of the sulfuric acid ester of an alkyl polyethylene glycol ether and 3 parts of calcium lignin sulfonate was finely ground. Such powder is suspendable in water and such suspension can be sprayed.

EXAMPLE 9

The herbicidal activity of the novel compounds according to the invention is exemplified by the following three tests.

(1) Pre-emergence soil treatment

Various seed were raked into soil contained in plastic flats kept in a greenhouse maintained at 21° C., watered in the first morning with water and treated in the first afternoon with a dispersion obtained by mixing an acetone solution of the active substance with an equal quantity of water. Thereafter the flats were watered normally and the sprouting observed and two weeks after seeding they were examined to see whether and to what extent the plant growth was suppressed.

(2) Post emergence soil treatment

The above procedure was followed except that the aqueous dispersion of the active substance was not applied to the soil until after the seeds had sprouted and the examination as to plant growth suppression was two weeks after the sprouting rather than after the seeding.

(3) Post emergence foliage treatment

The procedure under (2) was repeated except that the aqueous dispersion of the active substance was applied to the foliage of the sprouted plants rather than to the soil.

The results of the tests are given in the following Tables I and II. The numerical values given in the tables signify the quantity of active substance requiried, expressed in kg. per hectare, to repress 50% of the plant growth.

In Table I the compounds tested were of the formula:

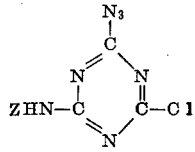

In compounds A, B, C and D of Table I, Z respectively is —$CH_3$, —$C_2H_5$, $i-C_3H_7$ and $t-C_4H_9$.

In Table II the compounds tested were of the formula

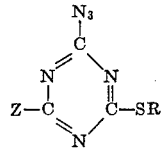

In compounds A, B, C, D and E of Table II, R, respectively, is —$CH_3$, —$CH_3$, —$CH_3$, —$CH_3$ and —$C_4H_9$ and Z, respectively, is —$NHC_2H_5$, —$N(C_2H_5)_2$, —NH-$i$-$C_3H_7$, —NH-$t$-$C_4H_9$ and —$NHCH_3$

TABLE I

| | Pre-emergence soil treatment | | | | Post emergence soil treatment | | | | Post emergence foliage treatment | | | |
|---|---|---|---|---|---|---|---|---|---|---|---|---|
| | A | B | C | D | A | B | C | D | A | B | C | D |
| Corn | >10 | >10 | >10 | >10 | >20 | >20 | >20 | >20 | >10 | >10 | >10 | 7.3 |
| Oats | >10 | 4.9 | 6.3 | >10 | >20 | >20 | 3.9 | >20 | >10 | 5.2 | 3.6 | 1.2 |
| Perennial rye grass | 2.3 | 3 | <1 | <1 | >20 | 8.5 | 5.0 | 3.1 | >10 | 4.2 | 1 | >1 |
| Peas | >10 | >10 | >10 | >10 | >20 | >20 | >20 | >20 | >10 | 6.2 | 5.0 | 2.4 |
| Flax | >10 | 8.3 | 2.8 | 2.8 | 20 | 6.6 | <1 | <1.0 | 9.1 | 3.4 | 1 | <1 |
| Mustard | 8.9 | 2.4 | <1 | <1 | 2 | 6.2 | 1.5 | <1.0 | <1 | 1.0 | 1 | <1 |
| Sugar beet | >10 | 6.8 | <1 | <1 | 7.8 | 10.0 | <1.0 | <1.0 | <1 | <1 | <1 | <1 |

TABLE II

| | Pre-emergence soil treatment | | | | | Post emergence soil treatment | | | | | Post emergence foliage treatment | | | | |
|---|---|---|---|---|---|---|---|---|---|---|---|---|---|---|---|
| | A | B | C | D | E | A | B | C | D | E | A | B | C | D | E |
| Corn | >10 | >10 | >10 | >10 | >10 | >20 | >20 | >20 | >20 | >20 | 5.9 | 3.2 | 1.9 | 3.2 | >10 |
| Oats | >10 | >10 | >10 | >10 | >10 | >20 | >20 | >20 | 16.3 | >20 | >10 | 7.0 | <1 | 2.0 | >10 |
| Perennial rye grass | 1.2 | 1.5 | <1 | 1 | >10 | 2.9 | >20 | <1 | 3.0 | >20 | 1.0 | 1.6 | 1 | <1.0 | 5.2 |
| Peas | >10 | >10 | >10 | >10 | >10 | >20 | >20 | >20 | >20 | >20 | 7.7 | 7.0 | 6.7 | 4.9 | 10 |
| Flax | 1.7 | 2.9 | <1 | <1 | >10 | 2.6 | 12.8 | <1 | <1.0 | >20 | <1 | 1.6 | <1 | <1.0 | 4.1 |
| Mustard | 3.1 | >10 | <1 | <1 | >10 | 7.8 | >20 | 1.4 | 2.3 | >20 | <1 | 2.0 | <1 | <1.0 | 3.7 |
| Sugar Beet | 2.2 | 5.4 | <1 | <1 | >10 | 1.7 | >20 | <1 | <1.0 | >20 | 1 | <1.0 | <1 | <1.0 | <1.0 |

EXAMPLE 10

Young flax plants when dusted with a dusting powder consisting of 10 parts of 2-i-propylamino-4-azido-6-methoxy-s-triazine exhibited heavy leaf scorch 2 days after the treatment.

EXAMPLE 11

A suspension of a mixture of 20 parts of 2-t-butylamino-4-azido-6-cyano-s-triazone, 170 parts of dimethyl formamide and 10 parts of dodecyl phenyl polyethylene glycol ether in water was sprayed onto young mustard plants. After 2 days the kill was complete.

We claim:
1. A triazine compound of the formula

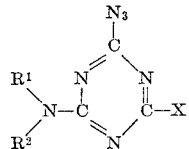

wherein X is a member selected from the group consisting of —CN and halogen, and each of $R^1$ and $R^2$ individually are selected from the group consisting of hydrogen, lower alkyl groups, lower alkenyl groups, lower alkyl groups carrying a substituent selected from the group consisting of —OR, —CN and $NO_2$ and lower alkenyl groups carrying a substituent selected from the group consisting of —OR, —CN and $NO_2$, R being lower alkyl.

References Cited

UNITED STATES PATENTS

| 2,211,709 | 8/1940 | Zerweck et al. | 260—249.8 |
| 2,267,068 | 12/1941 | Zerweck et al. | 260—249.8 |
| 3,202,499 | 8/1965 | Knusli | 260—249.9 |
| 3,321,453 | 5/1967 | Breslow | 260—249.8 |
| 3,415,827 | 12/1968 | Nikles et al. | 260—249.8 |

HENRY R. JILES, Primary Examiner

J. M. FORD, Assistant Examiner

U.S. Cl. X.R.

71—93; 260—249.6, 249.9